(12) United States Patent
Park et al.

(10) Patent No.: US 12,346,671 B2
(45) Date of Patent: Jul. 1, 2025

(54) METHOD AND APPARATUS FOR VISUAL CODING

(71) Applicant: FAMPPY INC., Anyang-si (KR)

(72) Inventors: Hae Jin Park, Seoul (KR); Sang Yong Lee, Seoul (KR); Hyun Jin Park, Seoul (KR); Gun Young Lee, Seoul (KR); Hyo Jeong Chang, Seoul (KR); Kil Yong Um, Gwangmyeong-si (KR); Yong Sung Kim, Namyangju-si (KR)

(73) Assignee: Famppy Inc. (KR)

( * ) Notice: Subject to any disclaimer, the term of this patent is extended or adjusted under 35 U.S.C. 154(b) by 0 days.

(21) Appl. No.: 17/923,195

(22) PCT Filed: Oct. 7, 2022

(86) PCT No.: PCT/KR2022/015074
§ 371 (c)(1),
(2) Date: Nov. 3, 2022

(87) PCT Pub. No.: WO2024/075870
PCT Pub. Date: Apr. 11, 2024

(65) Prior Publication Data
US 2024/0264806 A1 Aug. 8, 2024

(30) Foreign Application Priority Data
Oct. 6, 2022 (KR) .................. 10-2022-0128063

(51) Int. Cl.
*G06F 9/44* (2018.01)
*G06F 8/34* (2018.01)

(52) U.S. Cl.
CPC .................. *G06F 8/34* (2013.01)

(58) Field of Classification Search
CPC ... G06F 8/34; G06F 9/451; G06F 8/35; G06F 3/048; G06F 30/20; G06F 11/323;
(Continued)

(56) References Cited

U.S. PATENT DOCUMENTS 10,089,082 B2 * 10/2018 Douglas .................. G06F 8/34
2004/0264428 A1 12/2004 Choi et al.
(Continued)

FOREIGN PATENT DOCUMENTS

KR 1020100092618 A 8/2010
KR 20110015759 A 2/2011

*Primary Examiner* — Chuck O Kendall
(74) *Attorney, Agent, or Firm* — Lippes Mathias LLP

(57) ABSTRACT

The present specification provides a method for a terminal performing visual coding, the method including: generating a page for the visual coding and placing an asset on the page; setting a target asset that is a target of the visual coding on the basis of the placed asset; setting a user motion associated with an interaction with a user; setting a result associated with the target asset on the basis of the user motion; and displaying the result of the target asset on the basis of the user motion inputted, in which the result includes: a "function" for controlling size, position and state value of the target asset; a "computation" for computing variables associated with the target asset; and a "function page" representing a movement of the page.

7 Claims, 15 Drawing Sheets

(58) Field of Classification Search
CPC .... G06F 16/26; G06F 16/248; G06F 2111/02;
G06F 2209/545; G06F 11/32
USPC .................................................. 717/101–109
See application file for complete search history.

(56) References Cited

U.S. PATENT DOCUMENTS

| | | |
|---|---|---|
| 2005/0249117 A1 | 11/2005 | Gerkins |
| 2007/0280156 A1 | 12/2007 | Kwon et al. |
| 2008/0151848 A1 | 6/2008 | Fischer |
| 2008/0192713 A1 | 8/2008 | Mighani et al. |
| 2009/0067389 A1 | 3/2009 | Lee et al. |
| 2009/0271512 A1 | 10/2009 | Jorgensen |
| 2010/0061350 A1 | 3/2010 | Flammer, III |
| 2010/0135177 A1 | 6/2010 | Liu |
| 2011/0103352 A1 | 5/2011 | Wentink |
| 2011/0207466 A1 | 8/2011 | Hegge |
| 2012/0063433 A1 | 3/2012 | Wentink |
| 2013/0028243 A1 | 1/2013 | Wentink et al. |
| 2013/0136066 A1 | 5/2013 | Kim et al. |
| 2014/0003414 A1 | 1/2014 | Choudhury |
| 2014/0226651 A1 | 8/2014 | Lim |
| 2017/0316114 A1* | 11/2017 | Bourhani ................ G06F 30/00 |
| 2018/0349108 A1* | 12/2018 | Brebner ................ H04W 4/80 |

\* cited by examiner

500

CLICK
ONE-CLICK

DOUBLE-CLICK
CONTINUOUS ONE CLICK

HOLD
PRESS AND HOLD

DRAG AND DROP
HOLD AND MOVE

500

MOVE
FUNCTION TO MOVE

ROTATE
FUNCTION TO ROTATE

SIZE
RESIZING FUNCTION

CHANGE
SHAPE-CHANGING FUNCTION

METHOD AND APPARATUS FOR VISUAL CODING

CROSS REFERENCE TO RELATED APPLICATION

The present application claims priority of Korean Patent Application No. 10-2022-0128063 filed on Oct. 6, 2022, the entire contents of which is incorporated herein for all purposes by this reference.

BACKGROUND OF THE DISCLOSURE

Field of the Disclosure

The present specification relates to a method of providing a user with an environment for performing visual coding and a convergent production apparatus for supporting the visual coding.

STATE OF THE ART

In general, there are two ways to generate content using coding: a classical coding method of using a development language, and a coding method of combining blocks to which coding is applied.

However, the coding method of using the development language requires expert knowledge. The block coding method may provide an intuitive user interface (UI) to a user, but unlike the coding method of using the development language, the block coding method hardly implements complex or various interactions.

Therefore, there are problems in that the coding method of combining blocks to which coding is applied produces a simple form of content or mainly produces unidirectional content. Further, there are problems in that too many resources (e.g., time, effort) are required for a user with no development knowledge to create dynamic content.

SUMMARY OF THE DISCLOSURE

The present specification has been made in an effort to solve the above-mentioned problems, and an object of the present specification is to provide, through visual coding, a shallow learning curve to a user who intends to create content.

The present specification has also been made in an effort to provide a method of creating, through visual coding, content capable of being interactive, even though a user does not have expert knowledge.

Technical problems to be solved by the present specification are not limited to the above-mentioned technical problems, and other technical problems, which are not mentioned above, may be clearly understood from the following descriptions by those skilled in the art to which the present specification pertains.

In an embodiment of the present specification, a method for a terminal performing visual coding may include: generating a page for the visual coding and placing an asset on the page; setting a target asset that is a target of the visual coding on the basis of the placed asset; setting a user motion associated with an interaction with a user; setting a result associated with the target asset on the basis of the user motion; and displaying the result of the target asset on the basis of the user motion inputted, wherein the result includes (1) a "function" for controlling a size, a position and a state value of the target asset, (2) a "computation" for computing variables associated with the target asset, and (3) a "function page" representing a movement of the page.

In addition, setting the user motion may include: receiving 1) a type of the user motion and 2) a range value by which the type of the user motion is to be performed; and setting the user motion on the basis of the type of the user motion and the range value.

In addition, the type of the user motion may include an operation of the user clicking, double-clicking, holding, or dragging-and-dropping the target asset.

In addition, setting the result may include: displaying an item representing the function; receiving from the user 1) the item representing the function and 2) an operating time value corresponding to the item representing the function; receiving the selection of the user for an icon representing a result target asset to set a resulting state in which the function has been performed; receiving the resulting state of the target asset on the basis of the selection of the icon representing the result target asset; and setting the result on the basis of 1) the item representing the function, 2) the operating time value, and 3) the resulting state of the target asset.

In addition, setting the result may include: displaying an item representing the computation; receiving from the user 1) a computation target, 2) the item representing the computation, and 3) a condition that is a purpose of the item representing the computation; and setting the result on the basis of 1) the computation target, 2) the item representing the computation, and 3) the condition that is a purpose of the item representing the computation.

In addition, the method according to the embodiment of the present specification may further include: setting the computation target as a global variable.

In addition, setting the result may include: displaying an item representing an operation associated with the page; receiving from the user 1) the item representing the operation associated with the page and 2) a page that is a purpose of the operation associated with the page; and setting the result on the basis of 1) the item representing the operation associated with the page and 2) the page that is the purpose of the operation associated with the page.

In another embodiment of the present specification, a terminal for visual coding may include: a communication module; a memory; a display unit; and a processor configured to functionally control the communication module, the memory, and the display unit, in which the processor generates a page for the visual coding, places an asset on the page, sets a target asset that is a target of the visual coding on the basis of the placed asset, sets a user motion associated with an interaction with a user, sets a result associated with the target asset on the basis of the user motion, and displays the result of the target asset on the display unit on the basis of the user motion inputted, in which the result includes: (1) a "function" for controlling a size, a position and a state value of the target asset, (2) a "computation" for computing variables associated with the target asset, and (3) a "function page" representing a movement of the page.

According to the embodiment of the present specification, it is possible to provide the shallow learning curve to the user who intends to create content using a method for visual coding.

In addition, according to the embodiment of the present specification, it is possible to enable the user to create content capable of being interactive even though the user does not have expert knowledge.

The effects obtained by the present specification are not limited to the aforementioned effects, and other effects,

Figure 1:
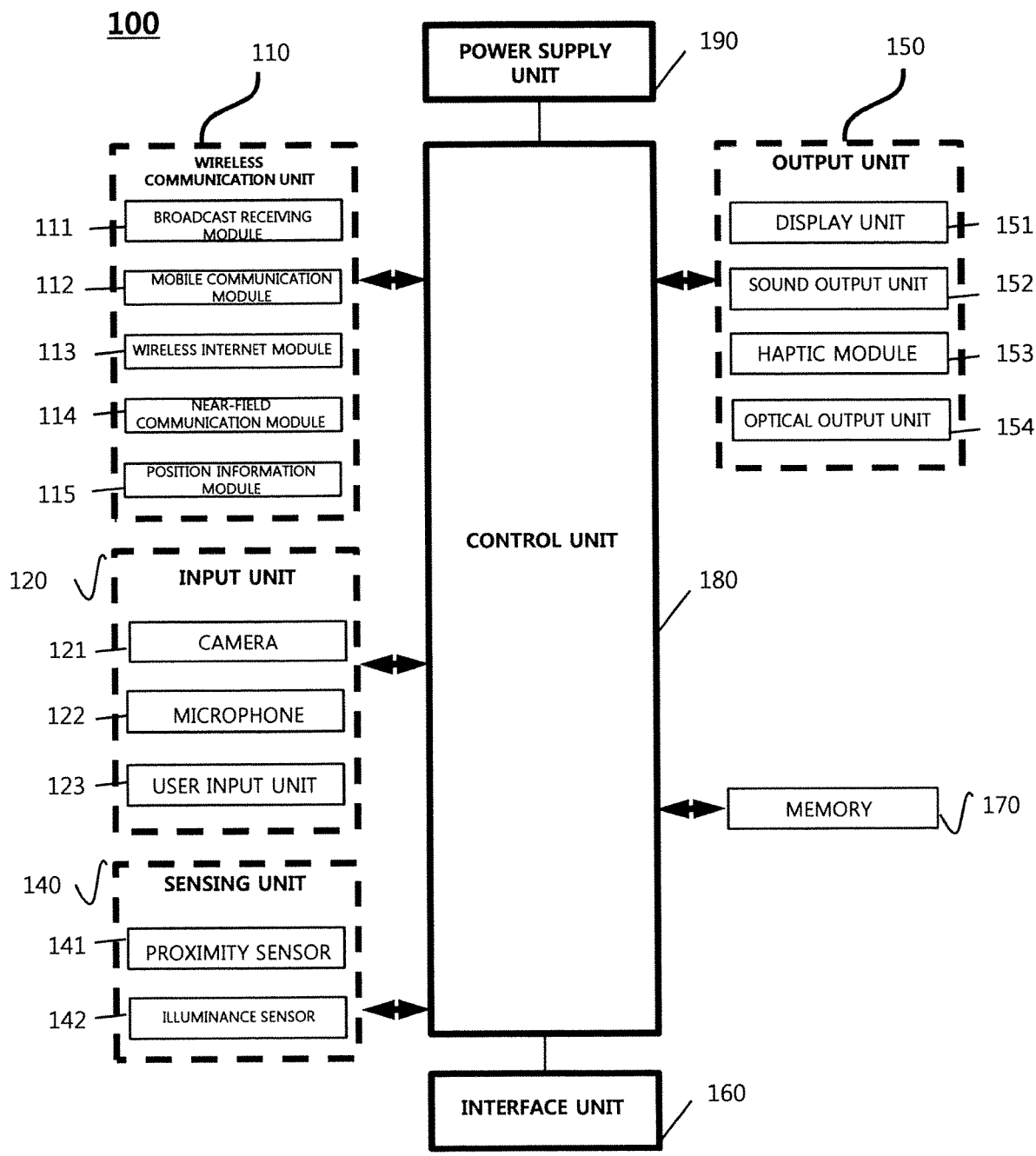
FIG. 1 is a block diagram for explaining an electronic device associated with the present specification.

The accompanying drawings included as a part of the detailed description for helping to understand the present specification provide exemplary embodiments of the present specification, and the technical features of the present specification will be described together with the detailed description.

DETAILED DESCRIPTION OF THE DISCLOSURE

Hereinafter, embodiments disclosed in the present specification will be described in detail with reference to the accompanying drawings. The same or similar constituent elements are assigned the same reference numerals regardless of reference numerals, and the repetitive description thereof will be omitted. The suffixes 'module', 'unit', 'part', and 'portion' used to describe constituent elements in the following description are used together or interchangeably in order to facilitate the description, but the suffixes themselves do not have distinguishable meanings or functions. In addition, in the description of the embodiment disclosed in the present specification, the specific descriptions of publicly known related technologies will be omitted when it is determined that the specific descriptions may obscure the subject matter of the embodiment disclosed in the present specification. In addition, it should be interpreted that the accompanying drawings are provided only to assist easy understanding of the embodiments disclosed in the present specification, and the technical spirit disclosed in the present specification is not limited by the accompanying drawings, and includes all alterations, equivalents, and alternatives that are included in the spirit and the technical scope of the present specification.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present application, it should be understood that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

FIG. 1 is a block diagram for explaining an electronic device 100 associated with the present specification.

The electronic device 100 may include a wireless communication unit 110, an input unit 120, a sensing unit 140, an output unit 150, an interface unit 160, a memory 170, a control unit 180, and a power supply unit 190. However, the constituent elements illustrated in FIG. 1 are not essential to implement the electronic device. The electronic device, which is described in the present specification, may have constituent elements larger or smaller in number than the constituent elements listed above.

More specifically, among the constituent elements, the wireless communication unit 110 may include one or more modules that enable wireless communication between the electronic device 100 and a wireless communication system, between the electronic device 100 and another electronic device 100, or between the electronic device 100 and an external server. In addition, the wireless communication unit 110 may include one or more modules that connect the electronic device 100 to one or more networks.

The wireless communication unit 110 may include at least one of a broadcast receiving module 111, a mobile communication module 112, a wireless Internet module 113, a near-field communication module 114, and a position information module 115.

The input unit 120 may include a camera 121 or a video input unit for video signal input, a microphone 122 or an audio input unit for audio signal input, and a user input unit 123 (e.g., a touch key, a mechanical key, etc.) for receiving information from a user. Voice data or image data collected by the input unit 120 may be analyzed and processed as the user's control instructions.

The sensing unit 140 may include one or more sensors for sensing at least one of information in the electronic device, surrounding environment information around the electronic device, and user information. For example, the sensing unit 140 may include at least one of a proximity sensor 141, an illumination sensor 142, a touch sensor, an acceleration sensor, a magnetic sensor, a gravity sensor, a gyroscope sensor, a motion sensor, an RGB sensor, an infrared sensor (IR sensor), a finger scan sensor, an ultrasonic sensor, an optical sensor (e.g., a camera (see reference numeral 121)), a microphone (see reference numeral 122), a battery gauger, an environmental sensor (e.g., a barometer, a hygrometer, a thermometer, a radiation sensing sensor, a thermal sensing sensor, a gas sensing sensor, etc.), and a chemical sensor (e.g., an electronic nose, a healthcare sensor, a biometric sensor, etc.). Meanwhile, the electronic device disclosed in the present specification may utilize a combination of pieces of information sensed by at least two of these sensors.

The output unit 150 may generate an output associated with sight, hearing or touch, and may include at least one of a display unit 151, an acoustic output unit 152, a haptic module 153, and an optical output unit 154. The display unit 151 may be configured to form a layer structure or be integrated with the touch sensor, thereby implementing a touch screen. The touch screen may not only serve as the user input unit 123 that provides an input interface between the electronic device 100 and the user, but also provide an output interface between the electronic device 100 and the user.

The interface unit 160 serves as a passage with various kinds of external devices connected to the electronic device 100. The interface unit 160 may include at least one of a wired/wireless headset port, an external charger port, a wired/wireless data port, a memory card port, a port for connecting a device equipped with an identification module, an audio I/O (Input/Output) port, a video I/O (Input/Output) port, and an earphone port. The electronic device 100 may perform appropriate control related to the connected external device in response to the connection of the external device to the interface unit 160.

In addition, the memory 170 stores data that support various functions of the electronic device 100. The memory 170 may store a plurality of application programs (or applications) to be executed by the electronic device 100 and data and instructions for the operation of the electronic device 100. At least some of the application programs may be downloaded from an external server through wireless communication. In addition, at least some of the application programs may exist in the electronic device 100 from the time of shipment for the basic functions of the electronic device 100 (e.g., call receiving/sending function and a message receiving/sending function). Meanwhile, the application program may be stored in the memory 170, installed in the electronic device 100, and executed by the control unit 180 so that the operation (or function) of the electronic device is performed.

The control unit 180 typically controls the overall operation of the electronic device 100 in addition to the operations associated with the application program. The control unit 180 may provide the user with appropriate information or functions or process the information or functions by processing signals, data, information, and the like inputted or outputted through the constituent elements described above or by executing the application program stored in the memory 170.

In addition, the control unit 180 may control at least some of the constituent elements described with FIG. 1 in order to execute the application program stored in the memory 170. Further, the control unit 180 may operate the combination of at least two of the components included in the electronic device 100 in order to execute the application program.

Under the control of the control unit 180, the power supply unit 190 receives external power and internal power and supplies the power to each constituent element included in the electronic device 100. The power supply unit 190 includes a battery. The battery may be a built-in battery or a replaceable battery.

At least some of the above constituent elements may operate in cooperation with each other to implement an operation, control, or control method of the electronic device according to various embodiments described below. In addition, the operation, control, or control method of the electronic device may be implemented in the electronic device by executing at least one application program stored in the memory 170.

In the present specification, the electronic device 100 may include a terminal and a visual coding apparatus.

Figure 2:
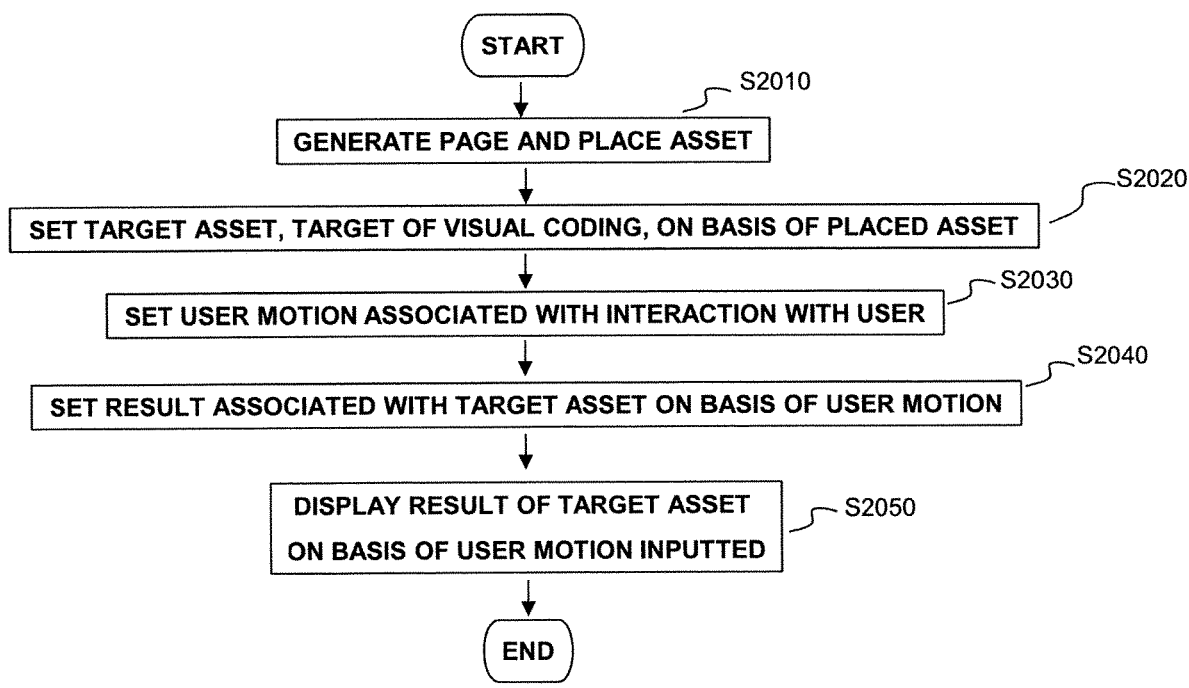
FIG. 2 is an embodiment to which the present specification may be applied.

FIG. 2 is an embodiment to which the present specification may be applied.

Referring to FIG. 2, the user may communicate with the visual coding apparatus through the terminal. For example, the terminal may be connected to the visual coding apparatus through WEB, without a separate application, and the user may create content using visual coding through the terminal.

Figure 3:
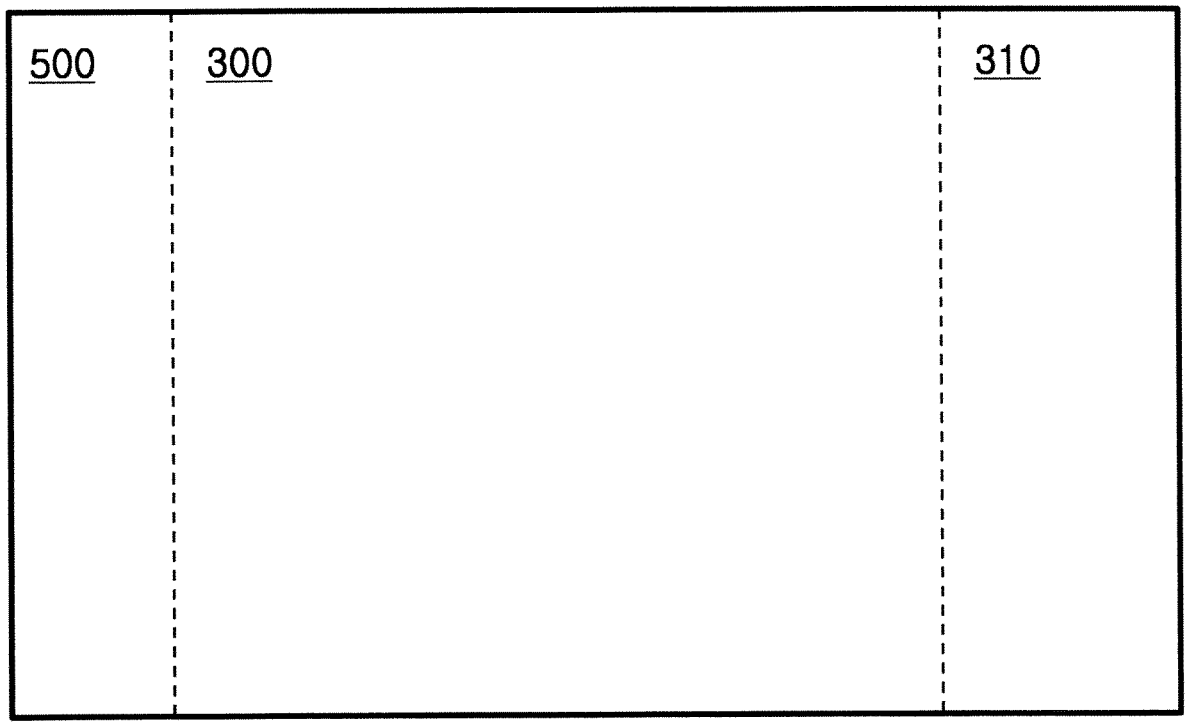
FIG. 3 is an example of a visual coding process screen to which the present specification may be applied.

FIG. 3 is an example of a visual coding process screen to which the present specification may be applied.

Referring to FIG. 3, the user may be provided with a visual coding process screen 200 from the visual coding apparatus through the terminal. For example, the process screen may include a main area 300 including a page, a first area 500, and a second area 310.

One piece of content may include one or more pages. In addition, the user may set events for assets included in the page through the second area 310 and select the detailed configurations of the events through the first area 500.

Referring back to FIG. 2, the terminal generates the page for visual coding and places assets on the page (S2010). For example, the terminal may display to the user a list of assets and/or a template including assets. The user may select assets to be placed on the page from the template.

The terminal sets a target asset that is a target of visual coding on the basis of the placed assets (S2020). For example, the user may select the target asset by clicking among the assets placed on the page.

Figure 4:
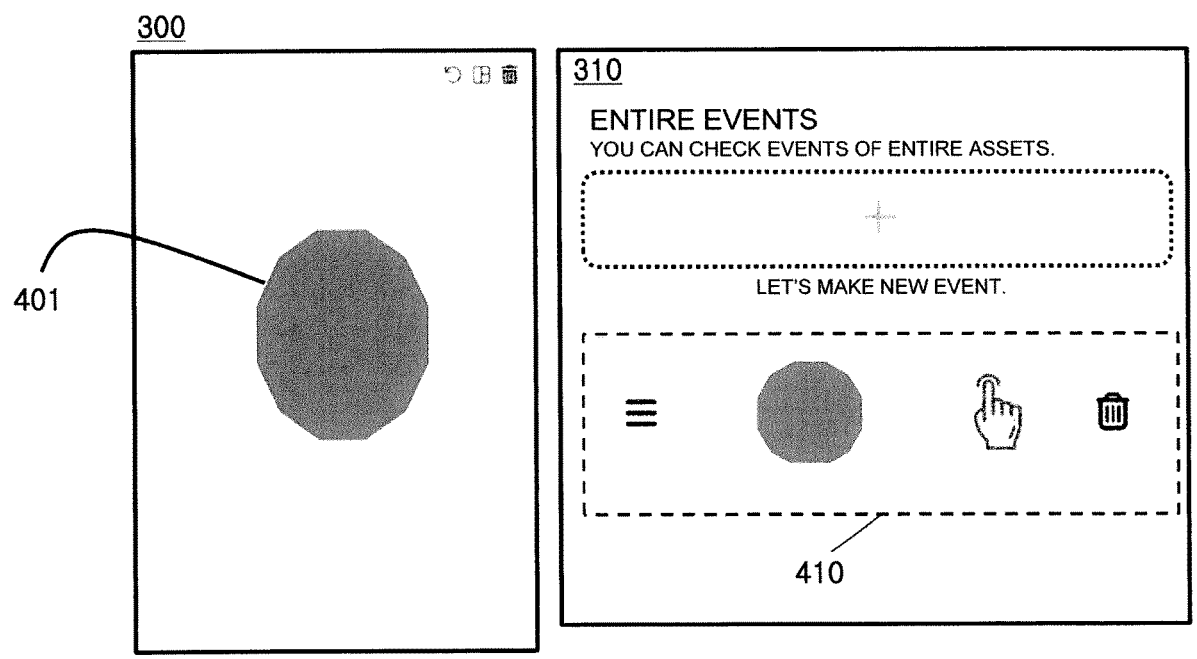
FIG. 4 is an example of target asset setting to which the present specification may be applied.

FIG. 4 is an example of target asset setting to which the present specification may be applied.

Referring to FIG. 4, the terminal may display a list of events of the entire assets, included in the content, in the second area 310. For example, when the target asset already has an event set, the terminal may display event items 410 of the target asset. When the target asset 401 is set, the terminal may display a detailed list of coding for setting the event of the target asset in the second area 310.

Referring back to FIG. 2, the terminal sets a user motion associated with an interaction with the user (S2030). For example, the user motion may be a condition for the event of the target asset to occur.

Figure 5:
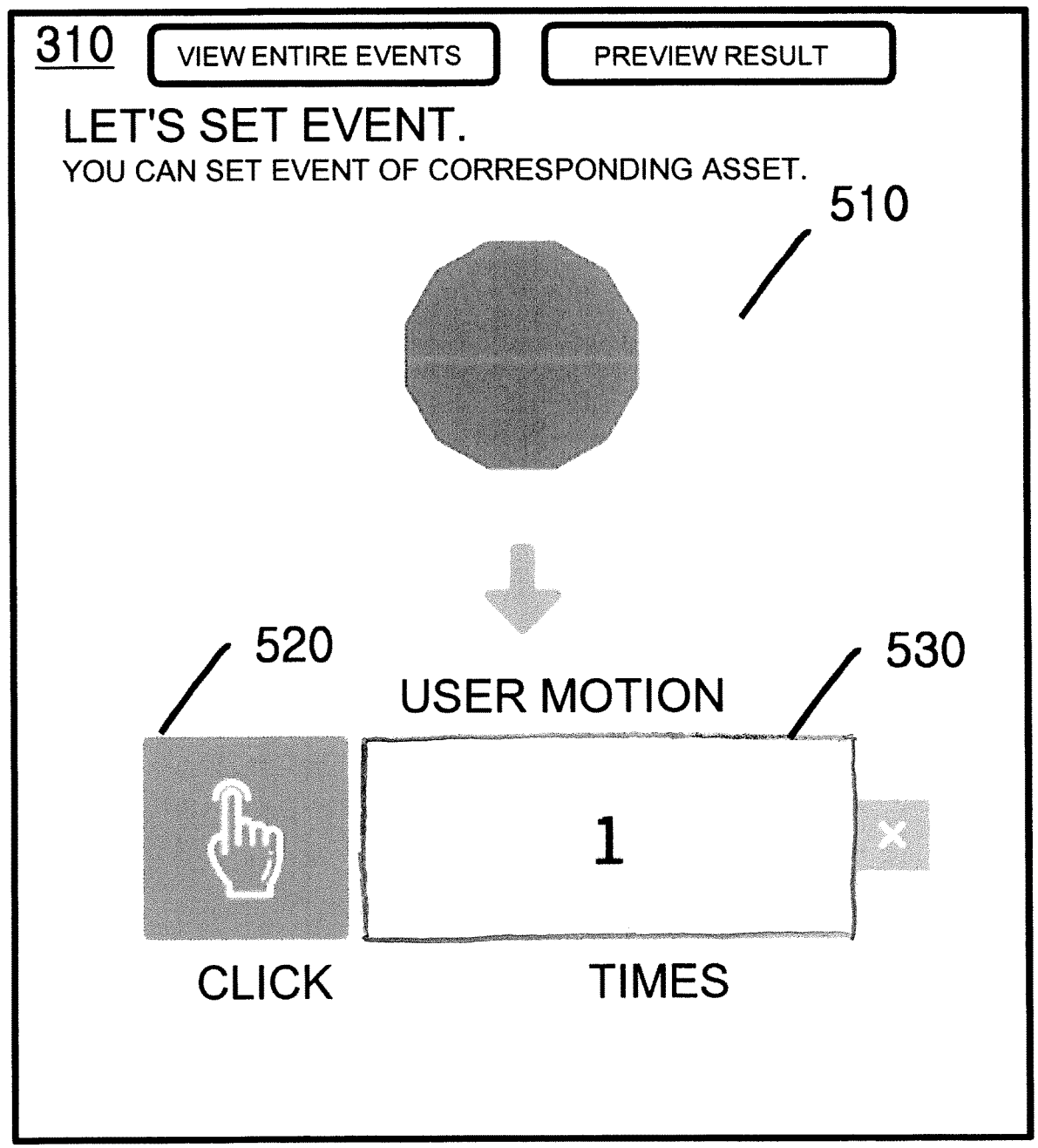
FIG. 5 is an example of user motion setting to which the present specification may be applied.

FIG. 5 is an example of user motion setting to which the present specification may be applied.

Referring to FIG. 5, when the user selects a target asset, the terminal may display a target asset 510. The terminal may display an input window for setting the user motion for the displayed target asset. The input window may include an input window 520 for receiving a type of the user motion and an input window 530 for receiving how many times the type of the user motion received is performed. The terminal may receive from the user the type of user motion and a range value (e.g., the number of clicks, an area of drag and drop) by which the type of user motion is to be performed, and may set the user motion on the basis of the type and range value of the user motion.

Figure 6:
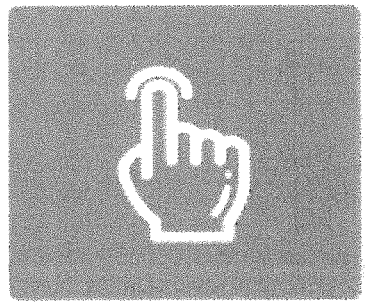
FIG. 6 is an example of types of user motions to which the present specification may be applied.
Figure 6:
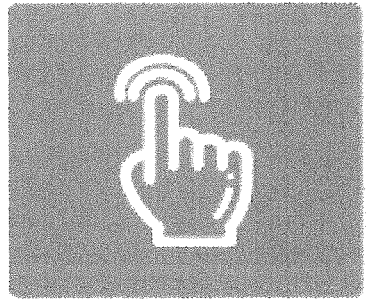
Figure 6:
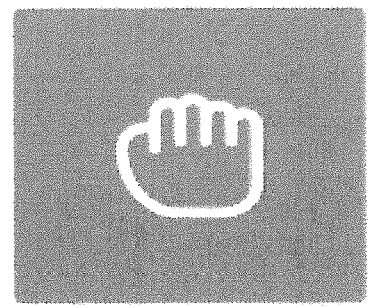
Figure 6:
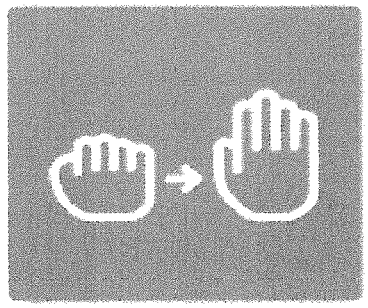

FIG. 6 is an example of types of user motions to which the present specification may be applied.

Referring to FIG. 6, the user motion may be an interaction which the terminal may receive from the user. For example, the type of the user motion may include interactions in which the user clicks, double-clicks, holds, or drag-and-drops the target asset.

The terminal, through the first area 500, may display to the user items of the user motion that the visual coding apparatus supports. The user motion for an initial target asset is empty, and the user may select and add user motion among the items of the user motion displayed in the first area 500 (e.g., see the input window 520 in FIG. 5).

Referring back to FIG. 2, the terminal sets a result associated with the target asset on the basis of the user motion (S2040). For example, the result may mean an operation performed in association with the target asset when the terminal receives an input corresponding to the user motion from the user. The result may include a "function" for controlling a size, a position, and a state value of the target asset, a "computation" for computing variables associated with the target asset, and a "function page" representing a movement of the page.

Figure 7:
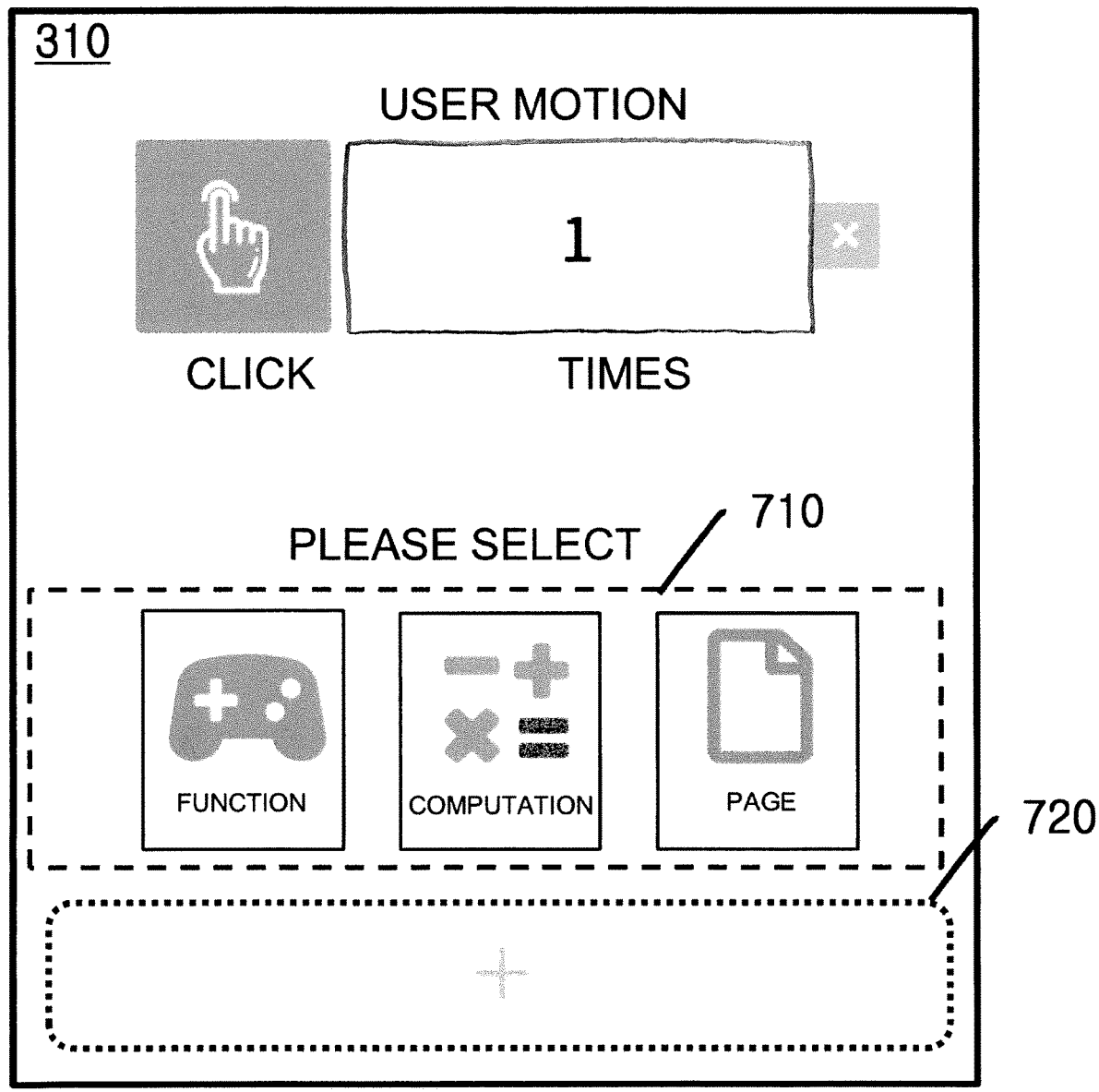
FIG. 7 is an example of types of results to which the present specification may be applied.

FIG. 7 is an example of types of results to which the present specification may be applied.

Referring to FIG. 7, when the user motion is set, the terminal may display items 710, representing the result that the user may select, through the second area 310. The terminal creates one item list 710 representing the initial result, and the user may, when necessary, enter a plus button 720 to further create a list of items.

Function

Figure 8:
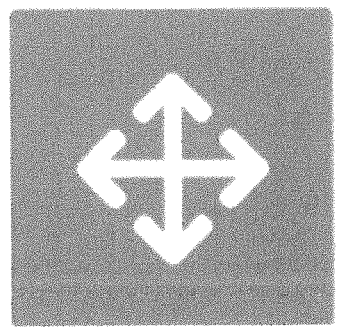
FIG. 8 is an example of a function to which the present specification may be applied.
Figure 8:
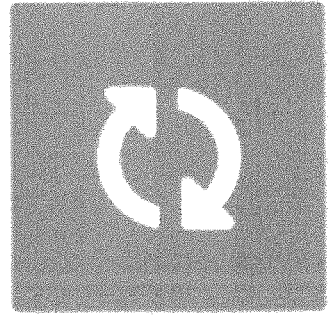
Figure 8:
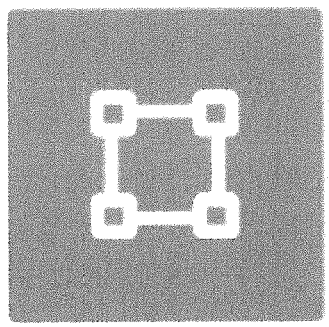
Figure 8:
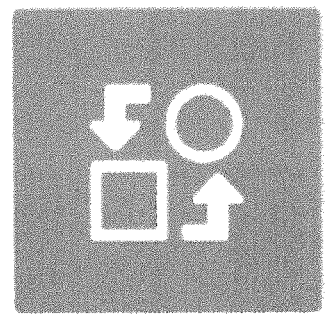

FIG. 8 is an example of a function to which the present specification may be applied.

Referring to FIG. 8, the terminal may display items representing a function through the first area 500. Examples of the function items may include movement, rotation, resizing, shape change, media playback, pause, stop, vibration, and the like in association with the movement of the target asset.

Figure 9:
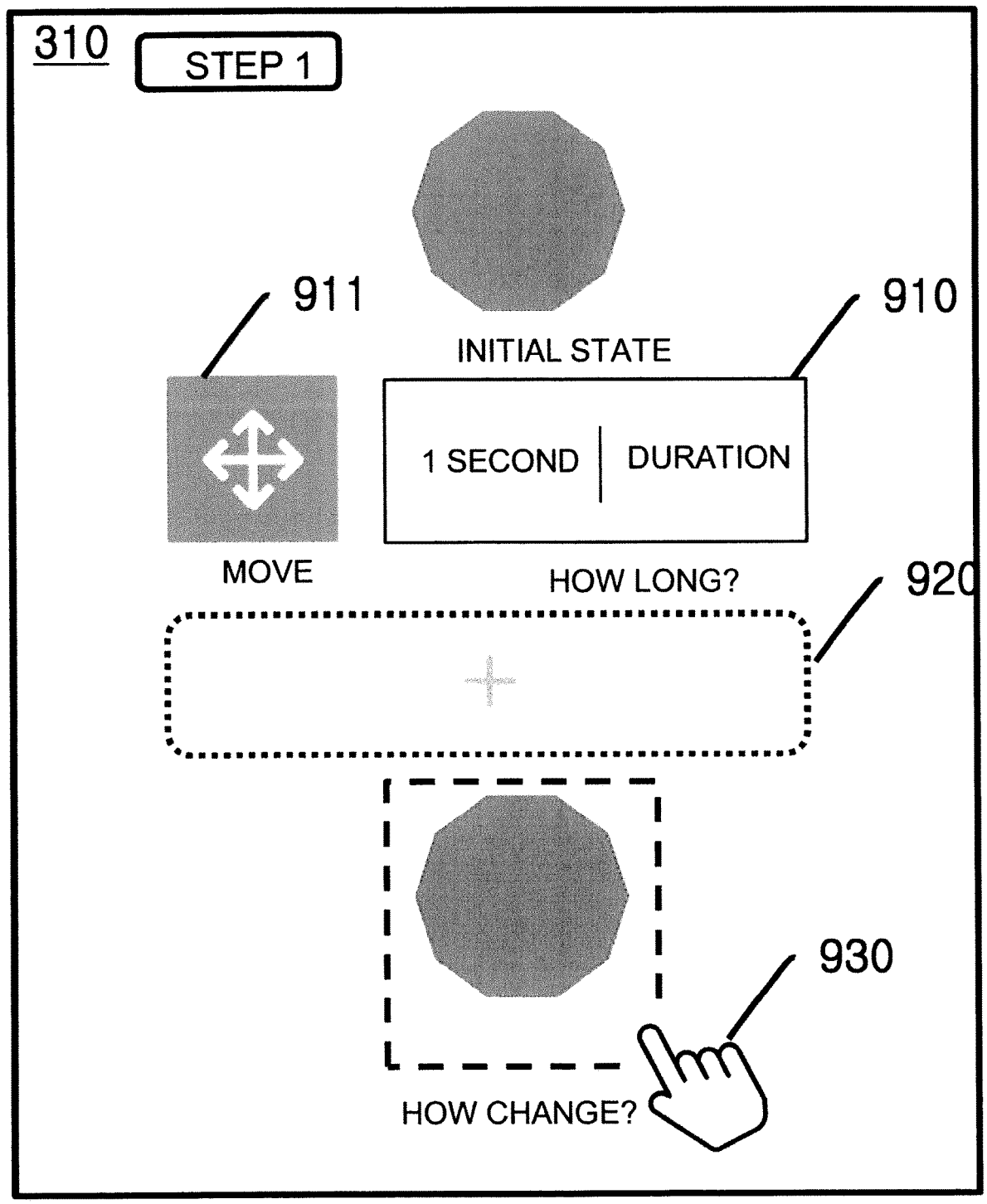
FIG. 9 is an example of function setting to which the present specification may be applied.

FIG. 9 is an example of function setting to which the present specification may be applied.

Referring to FIG. 9, the terminal may receive from the user a function item 911 and an operating time value 910 corresponding to the function item 911, through the second area 310. The user may enter a plus button 920 to set a plurality of functions for the target asset. Through the function, the terminal may control a size, a position, and a status value of the target asset.

The user may select an icon 930 representing a result target asset to set a resulting state in which the function has been performed.

Figure 10:
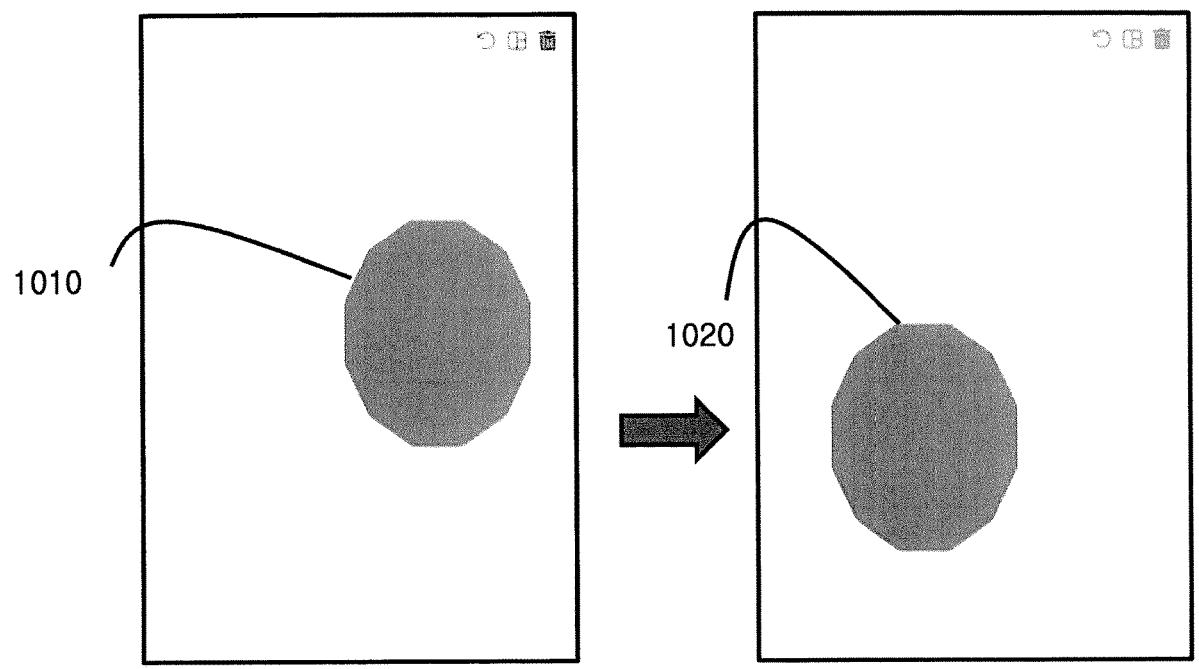
FIG. 10 is an example of setting of a resulting state in which a function has been performed to which the present specification may be applied.

FIG. 10 is an example of setting of a resulting state in which a function has been performed to which the present specification may be applied.

Referring to FIGS. 9 and 10, the user may click and select the icon 930 representing the result target asset to enter the resulting state in which the function of "move" has been performed. The terminal displays the target asset on the page, and the user may check a current state 1010 of the target asset. The user may move the target asset through drag and drop, in order to enter a resulting state 1020 in which the function has been performed on the target asset. For example, when the terminal receives the user motion corresponding to the target asset, the terminal may move the target asset from the current state 1010 to the resulting state 1020 for 1 second to display the target asset. The terminal may set the result on the basis of the function item 911, the operating time value 910, and the resulting state 1020.

Computation

Figure 11:
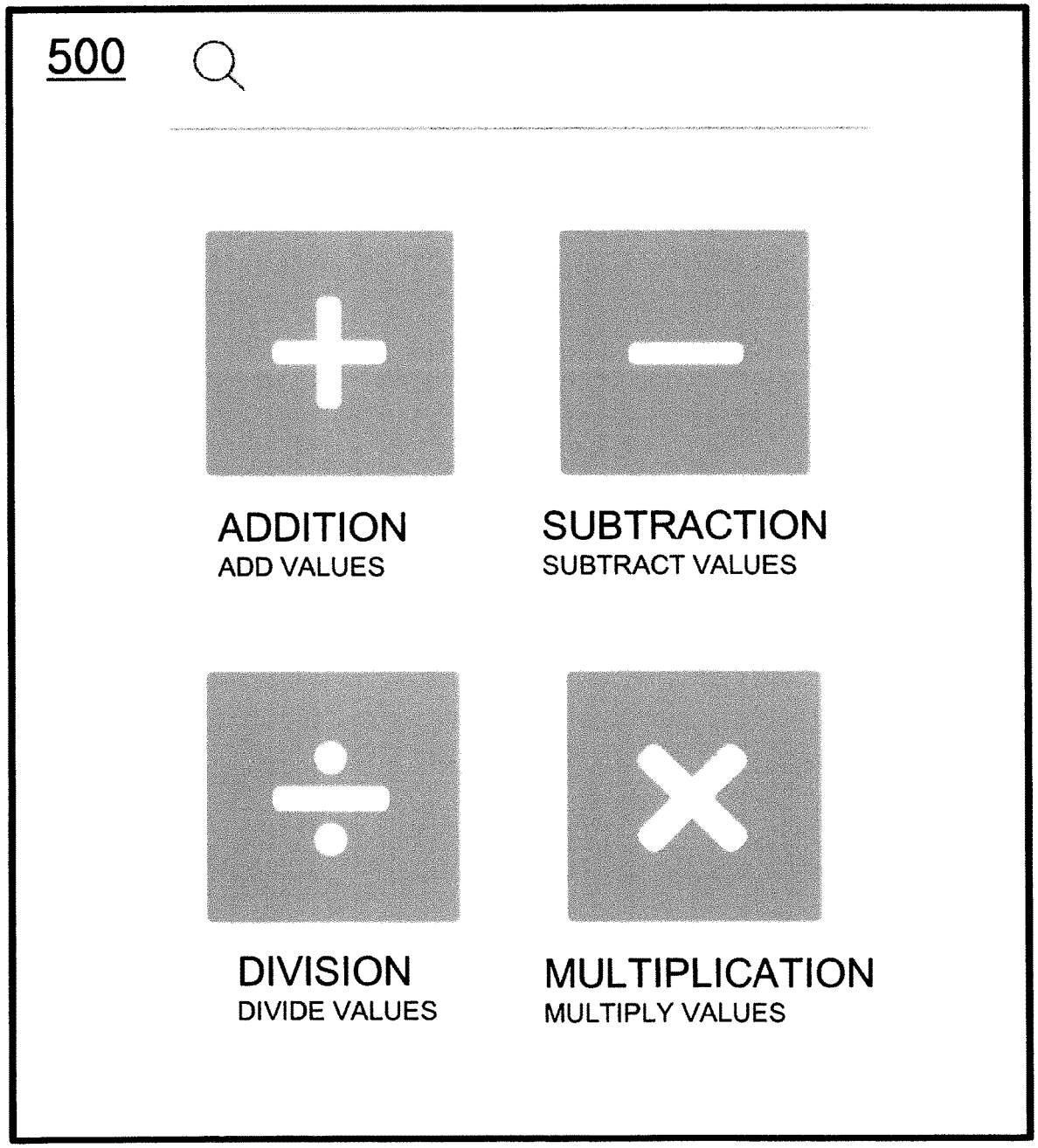
FIG. 11 is an example of computation to which the present specification may be applied.

FIG. 11 is an example of computation to which the present specification may be applied.

Referring to FIG. 11, the terminal may display items representing a computation, through the first area 500. Examples of the computation items may include addition, subtraction, division, multiplication, large, small, large or equal, small or equal, equal, different, included, non-included, and the like of variables associated with the target asset. A computation target may include numbers, letters, dates, timers, and the like. The user may designate the computation target among the assets of the page.

Figure 12:
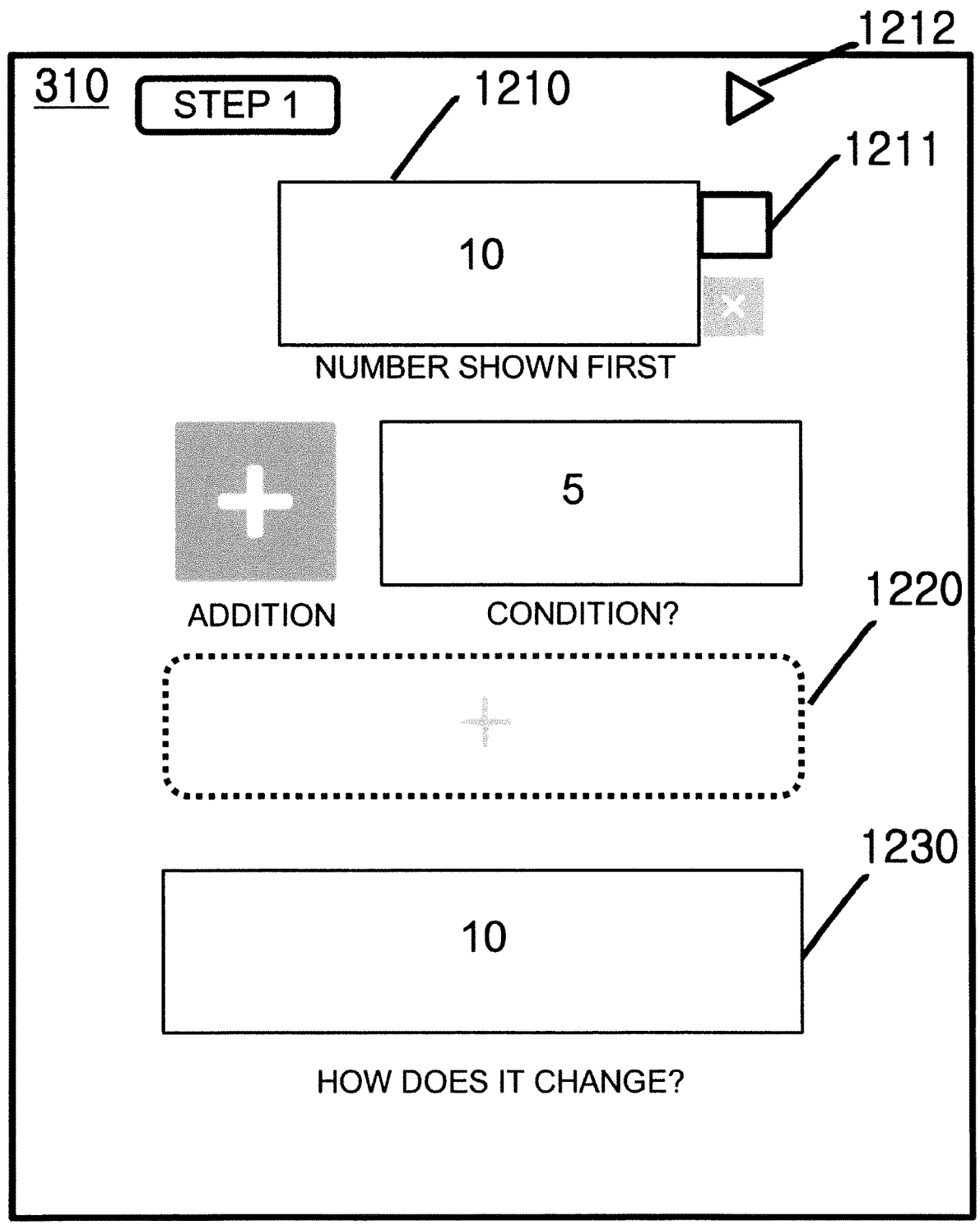
FIG. 12 is an example of computation setting to which the present specification may be applied.

FIG. 12 is an example of computation setting to which the present specification may be applied.

Referring to FIGS. 11 and 12, the user may enter a computation target 1210 through the second area 310. For example, the terminal may set the computation target 1210 as "10" that is a number. When the computation item is the addition, a condition that is a purpose of the computation item may be entered in the computation target. The user may set a plurality of computations through a plus button 1220.

For example, the user may identify through a 'preview' or 'play mode' from the terminal that the computation target 1230 changes In addition, the terminal may set the computation target as a global variable. The global variable may mean the computation target that is applicable not only to the page currently displayed in the main area 300, but also to the entire page of the corresponding content. This enables other pages to refer to the computation target on the current page. To set the computation target as the global variable, the user may select a checkbox 1211 for the global variable.

Function Page

Figure 13:
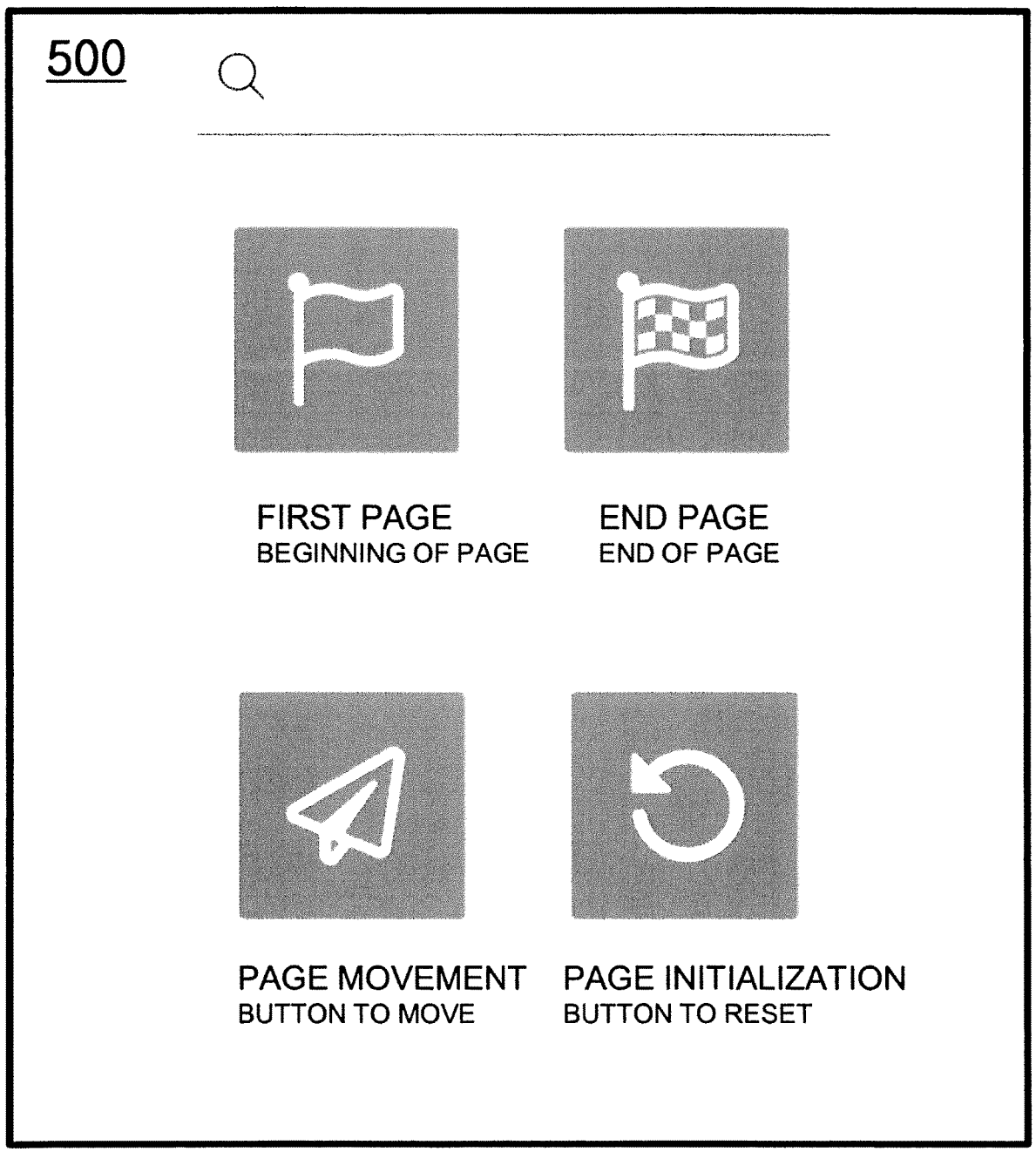
FIG. 13 is an example of a function page to which the present specification may be applied.

FIG. 13 is an example of a function page to which the present specification may be applied.

Referring to FIG. 13, the terminal may display items representing an operation associated with the page, through the first area 500. Examples of the items representing the operation associated with the page may include a first page, an end page, a page movement, a page initialization, and the like.

Figure 14:
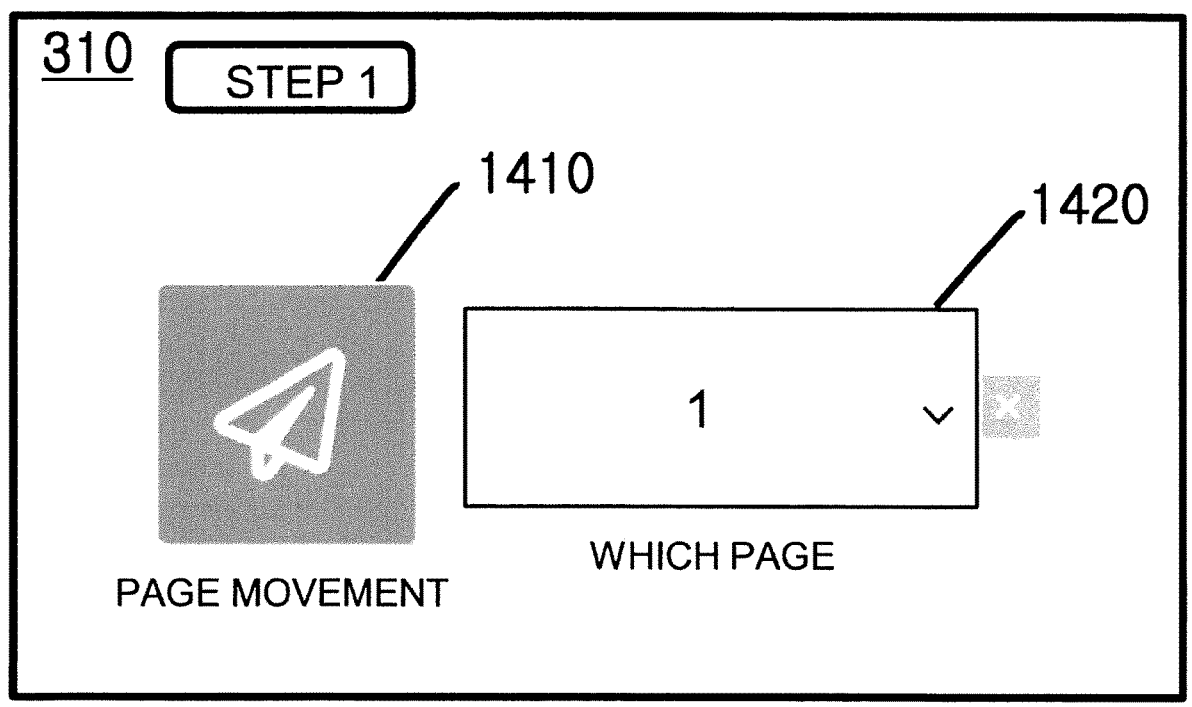
FIG. 14 is an example of function page setting to which the present specification may be applied.

FIG. 14 is an example of function page setting to which the present specification may be applied.

Referring to FIGS. 13 and 14, the user may set an item 1410 representing the operation associated with the page, through the second area 310. This enables the terminal to display a designated page. In this case, only one operation may be performed, unlike the function and computation.

Referring back to FIG. 2, the terminal displays the result of the target asset on the basis of the user motion input (S2050). For example, when the terminal receives a click on the target asset once, from the user, the terminal may move, as a result, the target asset for 1 second or display a screen that has been moved to another page. In addition, the terminal may perform a computation on the computation target through 'preview' and 'play mode' to display a result that the computation target has changed.

Figure 15:
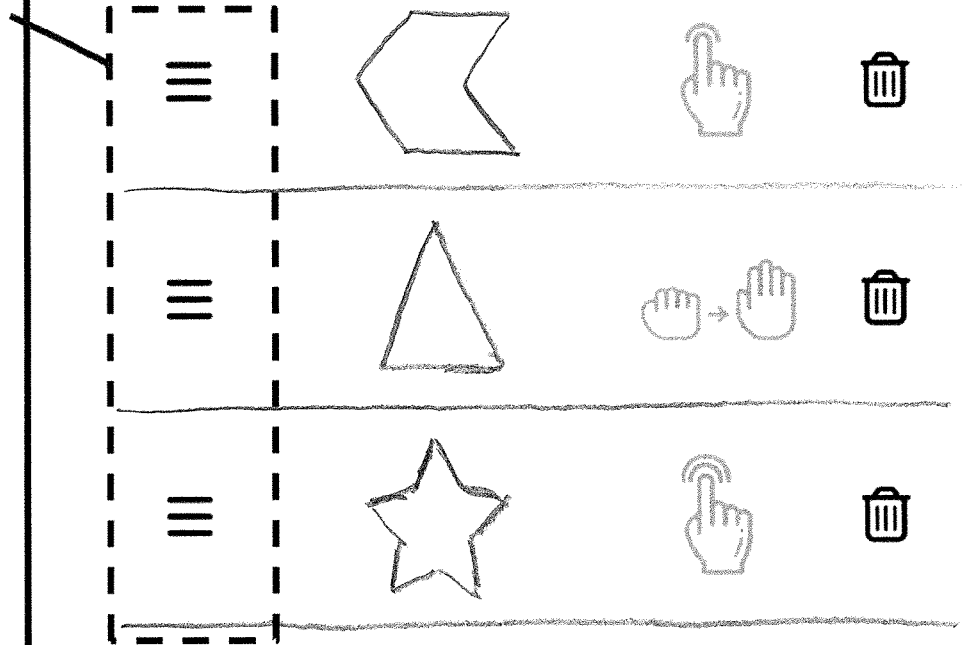
FIG. 15 is an example of a visual coding list to which the present specification may be applied.

FIG. 15 is an example of a visual coding list to which the present specification may be applied.

Referring to FIG. 15, the terminal may include a list containing visual coding items per asset. An order of these visual coding items may be arbitrarily modified by the user using a toggle button 1520 and the user may delete the visual coding items using a trash can icon.

Through the present specification, the user may create the content that is capable of easily interacting with the user through the visual coding with the shallow learning curve, and may use the visual coding apparatus as an educational tool for understanding the way a computer actually works.

The present specification described above may be implemented as a computer-readable code on a medium on which a program is recorded. The computer-readable medium includes all kinds of storage devices for storing data readable by a computer system. Examples of the computer-readable media include hard disk drive (HDD), solid state disk (SSD), silicon disk drives (SDD), ROM, RAM, CD-ROM, magnetic tape, floppy disc, and optical data storage device and also include one implemented in the form of a carrier wave (e.g., transmission over the Internet). Therefore, it should be appreciated that the detailed description is interpreted as being illustrative in every aspect, not restrictive. The scope of the present specification should be determined on the basis of the reasonable interpretation of the appended claims, and all of the modifications within the equivalent scope of the present specification belong to the scope of the present specification.

In addition, the service and embodiments have been mainly described above, but the embodiments are just for illustrative purposes and not intended to limit the present specification. It can be appreciated by those skilled in the art that various modifications and alterations, which are not described above, may be made without departing from the intrinsic features of the present service and embodiments. For example, the respective constituent elements specifically described in the embodiments may be modified and then carried out. Further, it should be interpreted that the differences related to the modifications and applications are included in the scope of the present specification defined by the appended claims.

The invention claimed is:

1. A method for a terminal performing visual coding comprising:
   generating a page for the visual coding and placing an asset on the page;
   setting a target asset that is a target of the visual coding on the basis of the placed asset;
   setting a user motion associated with an interaction with a user;
   setting a result associated with the target asset on the basis of the user motion;
   and displaying the result of the target asset on the basis of the user motion inputted, wherein the result comprises:
      a "function" for controlling a size, a position, and a state value of the target asset;
      a "computation" for computing variables associated with the target asset;
      and a "function page" representing a movement of the page;
   wherein setting the result comprises:
   displaying an item representing the function;
   receiving from the user (1) the item representing the function, and (2) an operating time value corresponding to the item representing the function;
   receiving a selection of the user for an icon associated with the target asset to
   set a resulting state in which the function has been performed;
   receiving the resulting state of the target asset on the basis of the selection of the icon representing the result target asset;
   and setting the result on the basis of (1) the item representing the function, (2) the operating time value, and (3) the resulting state of the target asset.

2. The method of claim 1, wherein setting the user motion comprises:
   receiving a type of the user motion and a range value by which the type of the user motion is to be performed;
   and setting the user motion on the basis of the type of the user motion and the range value.

3. The method of claim 2, wherein the type of the user motion comprises an operation of the user clicking, double-clicking, holding or dragging-and-dropping the target asset.

4. The method of claim 2, wherein setting the result comprises:
   displaying an item representing the computation;
   receiving from the user a computation target, the item representing the computation, and a condition that is a purpose of the item representing the computation;
   and setting the result on the basis of the computation target, the item representing the computation, and the condition that is a purpose of the item representing the computation.

5. The method of claim 4, further comprising: setting the computation target as a global variable.

6. The method of claim 2, wherein setting the result comprises: displaying an item representing an operation associated with the page;
   receiving from the user the item representing the operation associated with the page and a page that is a purpose of the operation associated with the page;
   and setting the result on the basis of the item representing the operation associated with the page and the page that is the purpose of the operation associated with the page.

7. A terminal for visual coding, the terminal comprising:
a communication module;
   a memory;
   a display unit;
   and a processor configured to functionally control the communication module, the memory, and the display unit, wherein the processor generates a page for the visual coding, places an asset on the page, sets a target asset that is a target of the visual coding on the basis of the placed asset, sets a user motion associated with an interaction with a user, sets a result associated with the target asset on the basis of the user motion, and displays the result of the target asset on the display unit on the basis of the user motion inputted, and wherein the result comprises:
   a "function" for controlling a size, a position, and a state value of the target asset;
   a "computation" for computing variables associated with the target asset;
   and a "function page" representing a movement of the page,
   wherein setting the result comprises:
   displaying an item representing the function;

receiving from the user (1) the item representing the function, and (2) an operating time value corresponding to the item representing the function;

receiving from the user (1) the item representing the function, and (2) an operating time value corresponding to the item representing the function;

receiving a selection of the user for an icon associated with the target asset to set a resulting state in which the function has been performed;

receiving the resulting state of the target asset on the basis of the selection of the icon representing the result target asset;

and setting the result on the basis of (1) the item representing the function, (2) the operating the time value, and (3) the resulting state of the target asset.

\* \* \* \* \*